(12) United States Patent
Watanabe et al.

(10) Patent No.: US 12,136,244 B2
(45) Date of Patent: Nov. 5, 2024

(54) ENCODING APPARATUS, ENCODING METHOD, AND PROGRAM

(71) Applicant: NIPPON TELEGRAPH AND TELEPHONE CORPORATION, Tokyo (JP)

(72) Inventors: Mayuko Watanabe, Musashino (JP); Ryuichi Tanida, Musashino (JP); Takayuki Onishi, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 391 days.

(21) Appl. No.: 17/621,436

(22) PCT Filed: Jun. 24, 2019

(86) PCT No.: PCT/JP2019/024976
§ 371 (c)(1),
(2) Date: Dec. 21, 2021

(87) PCT Pub. No.: WO2020/261334
PCT Pub. Date: Dec. 30, 2020

(65) Prior Publication Data
US 2022/0358684 A1    Nov. 10, 2022

(51) Int. Cl.
*G06T 9/40*    (2006.01)
(52) U.S. Cl.
CPC ..................................... *G06T 9/40* (2013.01)

(58) Field of Classification Search
CPC .... H04N 19/96; H04N 19/597; H04N 13/161; H04N 19/463; H04N 19/17; H04N 19/44;
(Continued)

(56) References Cited

U.S. PATENT DOCUMENTS

| 8,558,834 B2 * | 10/2013 | Lee ........................ G06T 17/005 |
| | | 345/424 |
| 2005/0180340 A1 | 8/2005 | Lee |
| 2005/0195191 A1 | 9/2005 | Lee et al. |

FOREIGN PATENT DOCUMENTS

| JP | 2005235210 A | 9/2005 | |
| JP | 2005259139 A * | 9/2005 | ........... G06T 17/005 |

OTHER PUBLICATIONS

Machine translation of JP-2005259139-A (Year: 2005).*
(Continued)

*Primary Examiner* — Aaron W Carter
*Assistant Examiner* — Courtney Joan Nelson
(74) *Attorney, Agent, or Firm* — Harness, Dickey & Pierce, P.L.C.

(57) ABSTRACT

An encoding device includes a division unit that acquires three-dimensional data representing positions of a plurality of points distributed along a surface of an object in a three-dimensional space and divides a parent space including the points in the three-dimensional space into a plurality of child spaces and an encoding unit that changes, based on a position of a target space, which is the child space, to which a sign representing whether the points are included is allocated, according to whether the points are included in a first child space adjacent to the target space, processing for allocating the sign to the target space and a second child space adjacent to the target space.

7 Claims, 9 Drawing Sheets

(58) Field of Classification Search
CPC ......... H04N 19/517; G06T 9/40; G06T 9/001; G06T 9/00; H03M 7/30
See application file for complete search history.

(56) References Cited

OTHER PUBLICATIONS

Sebastian Schwarz et al., Emerging MPEG Standards for Point Cloud Compression, IEEE Journal on Emerging and Selected Topics in Circuits and Systems, vol. 9, No. 1, 2019.

* cited by examiner

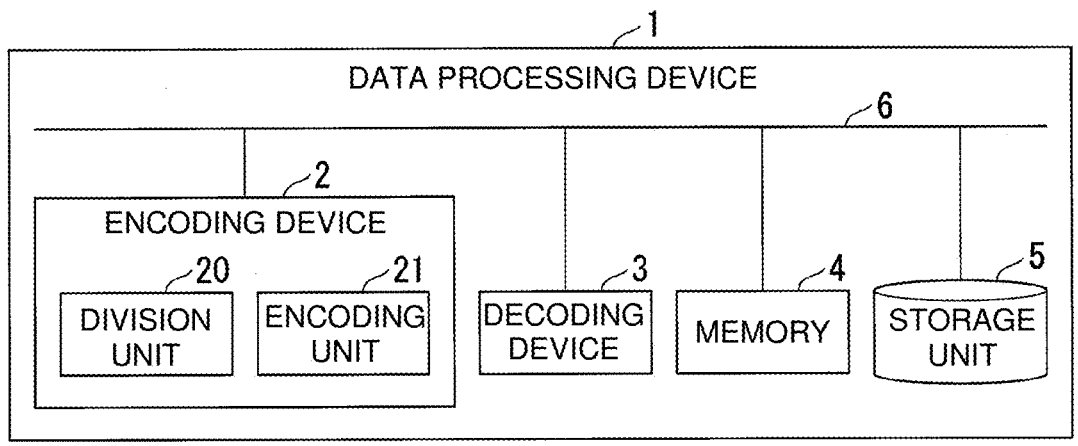
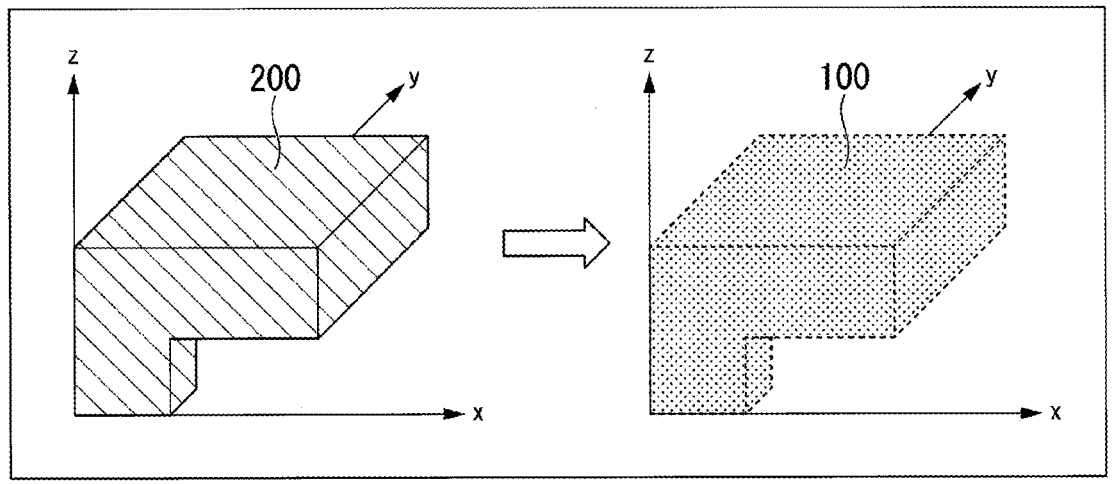

ENCODING APPARATUS, ENCODING METHOD, AND PROGRAM

CROSS-REFERENCE TO RELATED APPLICATIONS

This application is a 371 U.S. National Phase of International Application No. PCT/JP2019/024976 filed on Jun. 24, 2019. The entire disclosures of the above application is incorporated herein by reference.

TECHNICAL FIELD

The present invention relates to an encoding device, an encoding method, and a program.

BACKGROUND ART

The external shape of a landform, a building, a work of art, or the like is sometimes expressed using coordinate data of a three-dimensionally distributed point group (hereinafter referred to as "point group data"). According to the spread of the point group data, an encoding amount of the point group data has been rapidly increasing. Therefore, in the MPEG (Moving Picture Experts Group), a PCC (Point Cloud Compression) has been examined as a point group encoding technique for efficiently performing compression of the point group data.

In the PCC, a cube (a block) including the point group data is expressed using an octree. In the PCC, the octree represents eight child spaces of each parent space. The length of sides of the block is $2^k$ (k is a positive integer from 1 to "n"). For simplification of arithmetic processing, coordinates of the point group data are translated such that a minimum value of components of a three dimension (x, y, z) becomes 0. "k" is set to a minimum value among values with which the length "$2^k$" of the sides of the block is larger than a maximum value of the components of (x, y, z) (see Non-Patent Literature 1).

CITATION LIST

Non-Patent Literature

Non-Patent Literature 1: S. Schwarz, et. al, "Emerging MPEG Standards for Point Cloud Compression," IEEE JOURNAL ON EMERGING AND SELECTED TOPICS IN CIRCUITS AND SYSTEMS, VOL. 9, NO. 1, MARCH 2019, pp. 133-148.

SUMMARY OF THE INVENTION

Technical Problem

In the PCC, the point group data is compressed using a divided structure of a three-dimensional space including blocks. Sides of the parent space having the shape of the cube are equally divided into two, whereby the length of sides of the child space becomes $2^{(k-1)}$. In an octree representing 8 ($=2^3$) child spaces of each parent space, the parent space is also called the parent node and the child space is also called the child node.

Whether points are included in the child space (an occupied state of the points) is expressed for each child space by a 1-bit sign representing "1: points are included" or "0: points are not included". Therefore, whether points are included in the eight child spaces of each parent space is expressed by 8 bits (a range of 0 to 255 in a decimal number). The sides of the child space including the point group are equally divided into two, whereby whether points are included in eight grandchild spaces (child spaces of the child space) of each child space including the point group is also expressed by 8 bits. According to repetition of such arithmetic operations, the parent spaces (the parent nodes) in the three-dimensional space express, with 8 bits, whether points are included in the eight child spaces (child nodes) of the parent spaces. Note that the child space not including points is not further divided.

In the PCC, 8-bit data representing whether points are included in the eight child spaces of each parent space is compressed by being variable-length encoded based on an arithmetic encoding table. However, an encoding device sometimes cannot improve encoding efficiency of a point group distributed along the surface of an object. In related art, the point group is encoded based on whether points are included in the child spaces included in the block, and a pattern of presence of points based on the shape of the surface of the object is not considered. For example, the point group is encoded without considering the shape of a boundary between a first surface and a second surface forming the object and a corner of the object (in an object shown in FIG. 2 referred to below, a boundary among a first surface, a second surface, and a third surface).

In view of the above circumstances, an object of the present invention is to provide an encoding device, an encoding method, and a program capable of improving encoding efficiency of a point group distributed along the surface of an object.

Means for Solving the Problem

An aspect of the present invention is an encoding device including: a division unit that acquires three-dimensional data representing positions of a plurality of points distributed along a surface of an object in a three-dimensional space and divides a parent space including the points in the three-dimensional space into a plurality of child spaces; and an encoding unit that changes, based on a position of a target space, which is the child space, to which a sign representing whether the points are included is allocated, according to whether the points are included in a first child space adjacent to the target space, processing for allocating the sign to the target space and a second child space adjacent to the target space.

Effects of the Invention

According to the present invention, it is possible to improve encoding efficiency of a point group distributed along the surface of an object.

BRIEF DESCRIPTION OF DRAWINGS

FIG. 1 is a diagram showing a configuration example of a data processing device in a first embodiment.

FIG. 2 is a diagram showing an example of a point group and an object in the first embodiment.

DESCRIPTION OF EMBODIMENTS

Figure 3:
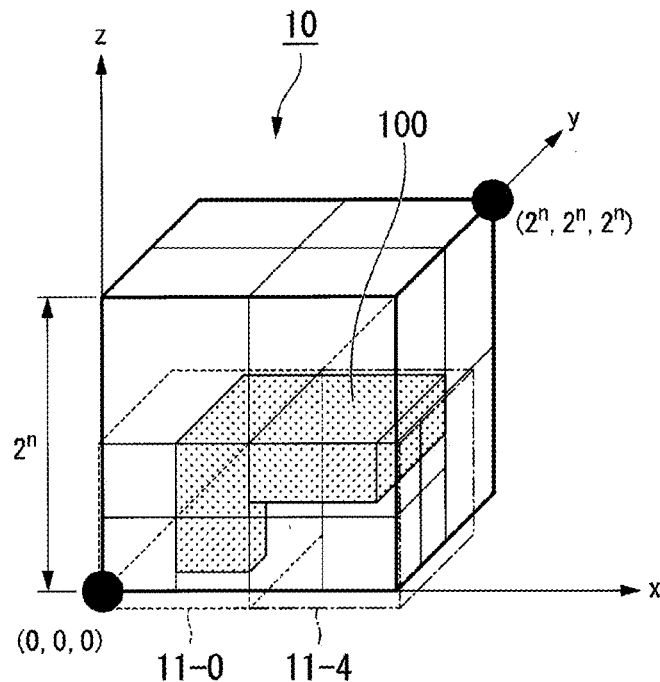
FIG. 3 is a diagram showing an example of a point group included in a three-dimensional space in the first embodiment.

Embodiments of the present invention are explained in detail with reference to the drawings.

First Embodiment

FIG. 1 is a diagram showing a configuration example of a data processing device 1. The data processing device 1 is a device that encodes and decodes coordinate data (point group data) of a plurality of points distributed along the surface of an object.

The data processing device 1 includes an encoding device 2, a decoding device 3, a memory 4, a storage unit 5, and a bus 6. The encoding device 2 includes a division unit 20 and an encoding unit 21.

A processor such as a CPU (Central Processing Unit) executes a program stored in the memory 4 or the storage unit 5, which is a nonvolatile recording medium (a non-transitory recording medium), whereby a part of or the entire data processing device 1 is realized as software. The program may be recorded in a computer-readable recording medium. The computer-readable recording medium is, for example, a non-transitory storage medium such as a portable medium such as a flexible disk, a magneto-optical disk, a ROM (Read Only Memory), or a CD-ROM (Compact Disc Read Only Memory) or a storage device such as a hard disk incorporated in a computer system. The program may be transmitted via an electric communication line. A part of or the entire data processing device 1 may be realized using, for example, hardware including an electronic circuit (circuitry) in which an LSI (Large Scale Integration circuit), an ASIC (Application Specific Integrated Circuit), a PLD (Programmable Logic Device), or an FPGA (Field Programmable Gate Array) is used.

The encoding device 2 is a device that encodes coordinate data (point group data) of a plurality of points distributed along the surface of an object. The decoding device 3 is a device that decodes coordinate data (point group data) of a plurality of points distributed along the surface of an object. The memory 4 stores, for example, a program. Note that the encoding device and the decoding device included in the data processing device may be individually used.

The storage unit 5 stores three-dimensional data including point group data quantized for each block (unit cube). In the three-dimensional data, the point group data represents coordinates of a plurality of points (a point group) distributed along the surface of an object in a three-dimensional space.

The storage unit 5 may store switching data of an arithmetic encoding table. The switching data is identification information representing an arithmetic encoding table selected at the time of encoding of the point group data. The switching data is used, for example, at the time of decoding of the point group data. The bus 6 transmits data among the functional units of the data processing device 1.

FIG. 2 is a diagram showing an example of a point group 100 and an object 200. Point group data represents the surface shape (the external shape) of an object. The object 200 is not limited to a specific object. In FIG. 2, as an example, the object 200 is a part of "a desk made of wood". However, about a case in which objects have the same shape like a boundary between a roadway and a sidewalk (that is, a boundary between an object and an object or a boundary between a surface and a surface of an object), it is possible to encode a point group with a smaller information amount by applying the data processing device 1. The point group 100 represents the surface shape of the object 200. A laser scanner or Lidar (Light Detection and Ranging) generates point group data based on a reflected wave of radar irradiated from a light source. The point group data acquired in that way is often a set of spatially sparse points because the surface shape of a region where the radar is irradiated, that is, an object is acquired and an internal structure is not reflected on the point group data.

Subsequently, details of the encoding device 2 are explained.

FIG. 3 is a diagram showing an example of the point group 100 included in a three-dimensional space 10. The division unit 20 acquires three-dimensional data from the storage unit 5. The division unit 20 executes, on the three-dimensional data, processing for dividing a parent space 11 including points in the three-dimensional space 10 into a plurality of child spaces.

Figure 4:
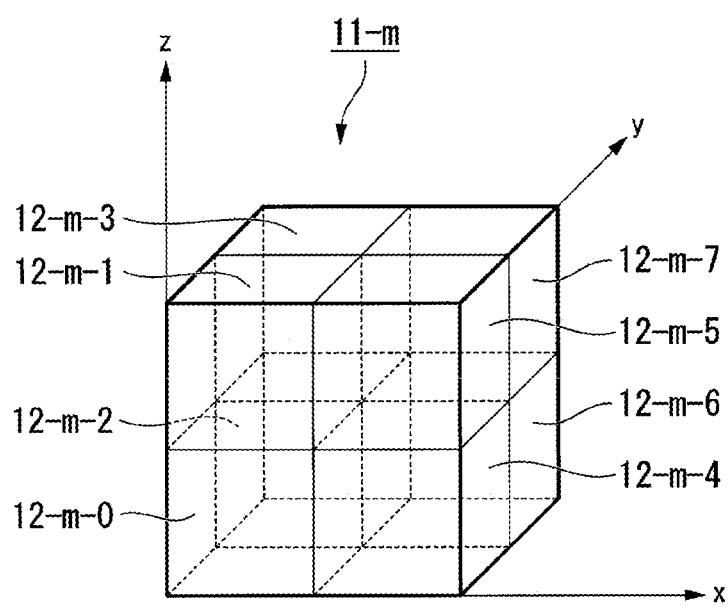
FIG. 4 is a diagram showing an example of a parent space and child spaces in the first embodiment.

FIG. 4 is a diagram showing an example of the parent space 11 and child spaces 12. The division unit 20 equally divides the parent space 11 into two in each of three directions (an x axis, a y axis, and a z axis) orthogonal to one another. Consequently, the division unit 20 generates eight child spaces 12 for each parent space 11 including points. In FIG. 4, a parent space 11-$m$ ($m$ is an integer equal to or larger than 0) included in the three-dimensional space 10 is configured from eight child spaces 12, that is, a "child space 12-$m$-0" to a "child space 12-$m$-7".

Figure 5:
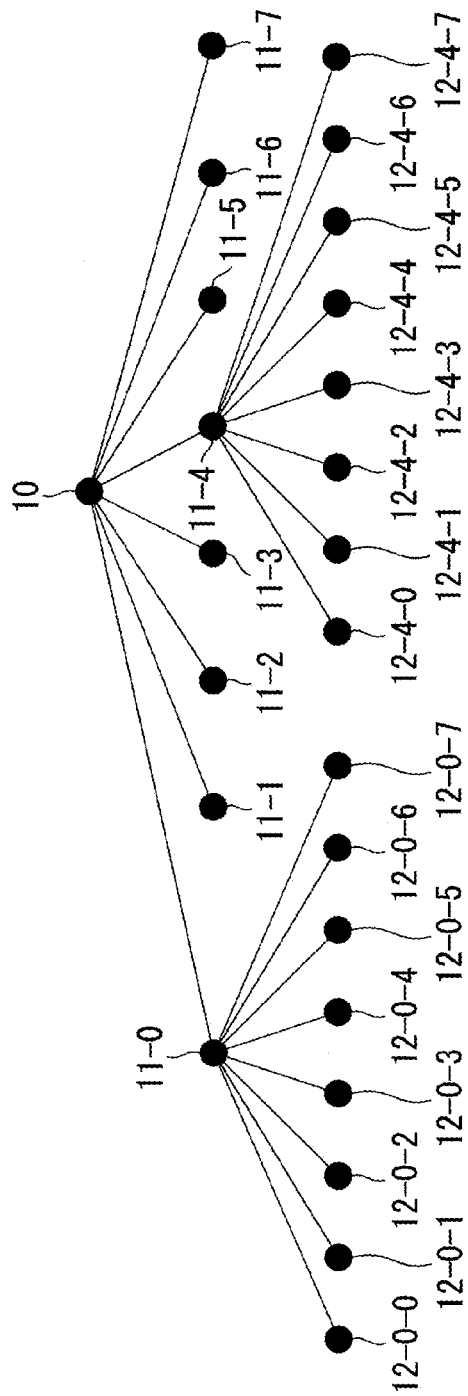
FIG. 5 is a diagram showing an example of an octree in the first embodiment.

FIG. 5 is a diagram showing an example of an octree. The divided three-dimensional space 10 is expressed using an octree. In the octree, spaces such as the parent space 11 and the child spaces 12 are expressed as nodes. A child space (a node) including points is further divided into eight grandchild spaces (child spaces of the child space).

The encoding unit 21 changes, according to whether points are included in a space adjacent to (a space around) a space to which a sign representing whether points are included is allocated (hereinafter referred to as "target space"), processing for allocating the sign to the target space and other spaces adjacent to the target space. For example, when a first parent space and a second parent space are adjacent to each other, the encoding unit 21 selects an arithmetic encoding table used for encoding of the target space according to whether points are included in the first parent space adjacent to the second parent space including the target space (a child space group).

Note that the target space in the parent space may be, for example, a space configured from one child space or may be, for example, a space configured from four child spaces. From which child space group the target space is configured may be decided according to whether points are included in one or more child spaces adjacent to the parent space including the target space. For example, in the octree shown in FIG. 5, in the three-dimensional space 10, a parent space 11-0 and a parent space 11-4 are adjacent to each other. In the arithmetic encoding table, one or more target spaces are set as targets of encoding in the parent space 11-4. For example, the encoding unit 21 may select the arithmetic encoding table used for encoding of the parent space 11-4 according to whether points are included in child spaces 12-0 of the parent space 11-0 (a parent space around the target space) adjacent to the parent space 11-4 including the target space (a child space 12-4).

The octree is represented, for example, like Expression (1), where each of $x_0$ to $x_7$ is a sign representing whether points are included in the child spaces 12.

[Math. 1]

$$f(x_0, x_1, x_2, x_3, x_4, x_5, x_6, x_7) = \sum_{k=0}^{7} x_k 2^k \quad (1)$$

The positions of the child spaces 12 including points are expressed for each parent space 11 with values 0 to 255. For example, when only a child space 12-0-0 and a child space 12-0-1 include points, as a block value "f" of the parent space 11-0, "f(1, 1, 0, 0, 0, 0, 0, 0)" is expressed as 3 in a decimal number. For example, when all child spaces 12-4 of the parent space 11-4 include points, as a block value of the parent space 11-4, "f(1, 1, 1, 1, 1, 1, 1, 1)" is expressed as 255 in a decimal number. In this way, variable-length encoding is executed on the values 0 to 255 in order from a highest-order parent space (parent node).

Figure 6:
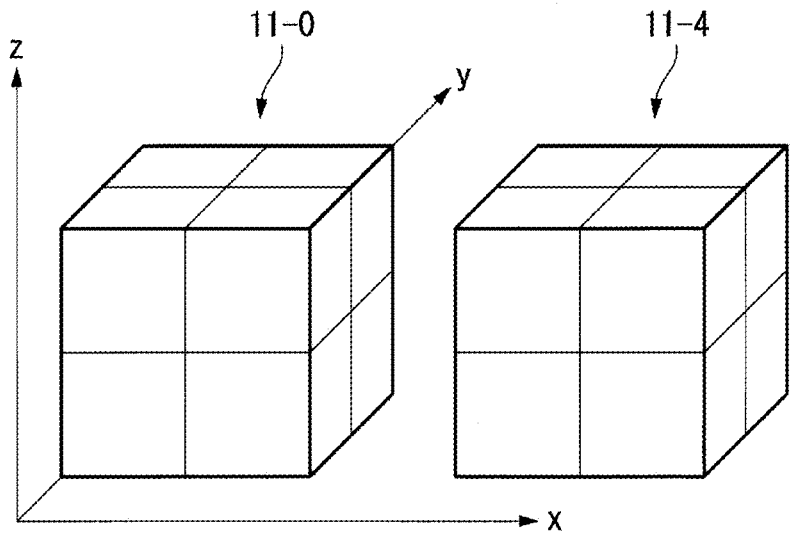
FIG. 6 is a diagram showing an example of parent spaces adjacent to each other in the first embodiment.

FIG. 6 is a diagram showing an example of the parent spaces 11 adjacent to each other. The encoding unit 21 determines whether the first parent space (the parent space 11-0) adjacent to the second parent space (the parent space 11-4) including the target space is present. In FIG. 6, the parent space 11-0 and the parent space 11-4 are adjacent to each other. A size of the parent space 11-0 is the same as a size of the parent space 11-4. Child spaces of the parent space 11-0 are already encoded.

In FIG. 6, since the parent space 11-0 adjacent to the parent space 11-4 is present, the encoding unit 21 selects an arithmetic encoding table for encoding of the parent space 11-4 (the second parent space) according to whether points are included in the child spaces in the parent space 11-0 (the first parent space) (an occupied state of points). In FIG. 6, in the arithmetic encoding table for encoding of the parent space 11-4, only a part of the child spaces of the parent space 11-4 may be set as targets of encoding. A sign allocated to the child spaces not set as the targets of encoding (the child spaces other than the target space) is "0" representing that points are not included. That is, at least one of $x_0$ to $x_7$ in Expression (1) is 0. For example, when the parent space 11-0 is divided such that the parent space 11-0 (the first parent space) adjacent to the parent space 11-4, which is the encoding target, is divided into two in the center and child spaces of one of the divided parent spaces 11-0 is adjacent to the parent space 11-4 (the second parent space), an arithmetic encoding table used for encoding of a point group of the parent space 11-4 is selected based on presence or absence of points in any one of the child spaces adjacent to the parent space 11-4 and presence or absence of points in any one of the child spaces not adjacent to the parent space 11-4 in the parent space 11-0.

When another parent space 11 (the first parent space) adjacent to the parent space 11-4 (the second parent space) is absent, the encoding unit 21 may encode the parent space 11-4 using a predetermined arithmetic encoding table. In the predetermined arithmetic encoding table, for example, all the child spaces of the parent space 11-4 may be set as targets of encoding.

The decoding device 3 determines whether points are included in the child spaces 12 of the first parent space adjacent to a decoding target second parent space (an occupied state of points). A size of the adjacent first parent space is the same as a space of the decoding target second parent space. The adjacent first parent space is already decoded.

The decoding device 3 selects an arithmetic encoding table used for decoding of a decoding target parent space 11 according to whether points are included in the child spaces 12 of another parent space 11 adjacent to the decoding target parent space 11. For example, the decoding device 3 selects, based on switching data, the same arithmetic encoding table as the arithmetic encoding table used for the encoding of the parent space 11 by the encoding device 2. The decoding device 3 may select the switching data according to whether points are included in the child spaces 12 of the other parent space 11 adjacent to the decoding target parent space 11 (an occupied state of points).

Subsequently, an operation example of the encoding device 2 is explained.

Figure 7:
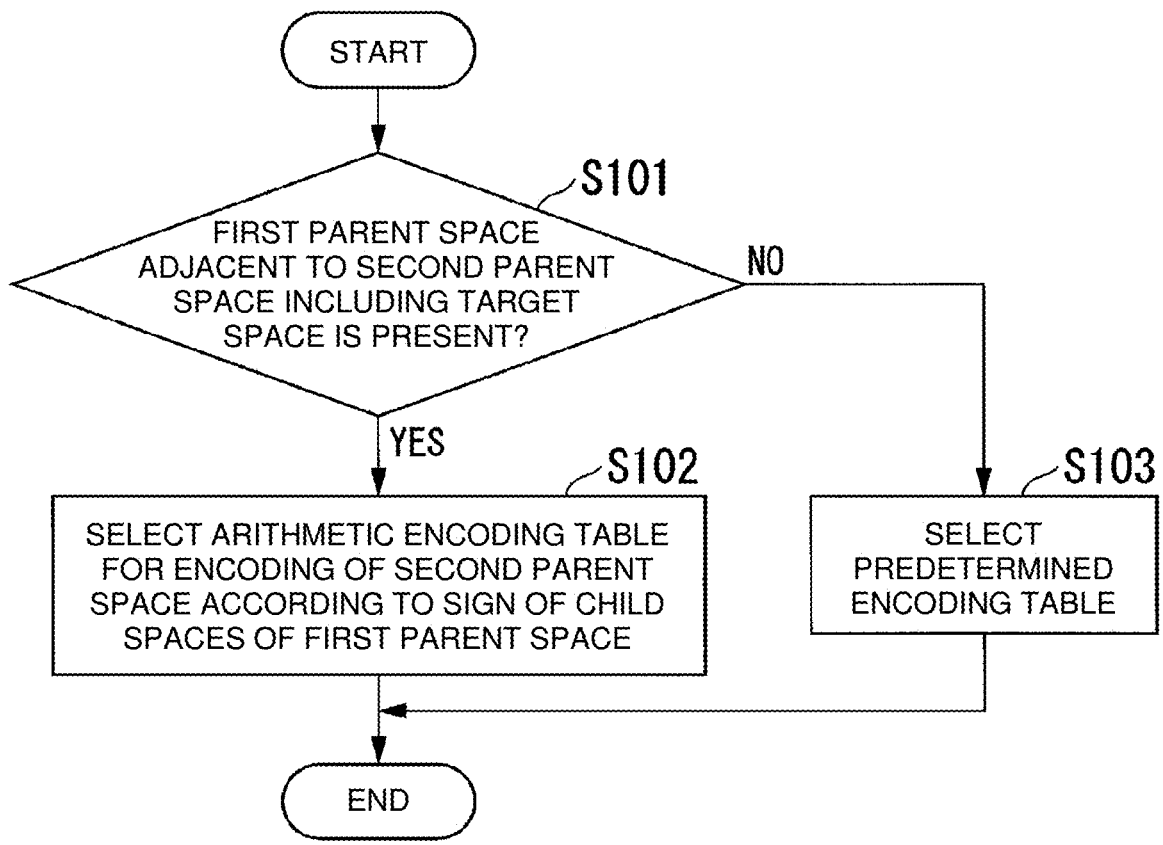
FIG. 7 is a flowchart showing an operation example of an encoding device in the first embodiment.

FIG. 7 is a flowchart showing an operation example of the encoding device 2. The encoding unit 21 determines whether the first parent space (for example, the parent space 11-0) adjacent to the second parent space (for example, the parent space 11-4) including a target space is present (step S101).

When the first parent space adjacent to the second parent space is present (step S101: YES), the encoding unit 21 selects, according to a sign of the child spaces 12 of the first parent space, an arithmetic encoding table for allocating a sign to the child spaces 12 included in the second parent space. For example, the encoding unit 21 selects an arithmetic encoding table for allocating a sign to a part of a plurality of child spaces 12-4 of the parent space 11-4 (step S102).

When the first parent space adjacent to the second parent space is absent (step S101: NO), the encoding unit 21 selects a predetermined arithmetic encoding table. The predetermined arithmetic encoding table is, for example, an arithmetic encoding table predetermined in order to allocate a sign to all the child spaces 12-4 in the parent space 11-4 (step S103).

As explained above, the data processing device 1 in the first embodiment includes the division unit 20 and the encoding unit 21. The division unit 20 acquires three-dimensional data (the point group 100) representing the positions of a plurality of points distributed along the surface of the object 200 in the three-dimensional space 10. The division unit 20 divides the parent space 11 including points in the three-dimensional space 10 into a plurality of child spaces 12. The encoding unit 21 may decide, as a reference of a position, a target space, which is the child space 12 to which a sign representing whether points are included is allocated. The encoding unit 21 changes, according to whether points are included in the first child space (for example, a child space of the parent space 11-0) adjacent to the target space, for example, processing for allocating a sign to the target space in the parent space 11-4 and the second child space adjacent to the target space. The target space in the parent space 11-4 may be configured from, for example, one child space 12-4 or may be configured from, for example, four child spaces 12-4.

The encoding unit 21 changing the processing for allocating a sign means that, for example, the encoding unit 21 selects an arithmetic encoding table for allocating a sign to a part of a plurality of child spaces in the target space. The occupied state of the points in the target space is sometimes limited to a specific occupied state according to an occupied state of a point group in a child space group adjacent to the target space. When a sign is allocated to a part of eight child spaces, for example, an arithmetic encoding table in which the length of a sign allocated to a child space group is shorter than 8 bits is selected. Consequently, it is possible to improve encoding efficiency of a point group distributed along the surface of an object.

When an arithmetic encoding table is appropriately selected for each parent space (node), since a code amount of point group data is reduced, encoding efficiency is improved. Note that, when switching data is appropriately selected according to whether points are included in the child spaces 12 of another parent space 11 adjacent to an encoding target parent space 11 (an occupied state of points), the encoding unit 21 can prevent a code amount of the switching data from increasing (the switching data from becoming overhead).

The data processing device 1 estimates, based on point group data of other blocks around an encoding target block, point group data of each block (node) expressed using an octree. The data processing device 1 changes, based on an estimation result, processing for allocating a sign to a target space. That is, when encoding an occupied state of points of each encoding target block, the data processing device 1 uses an occupied state of points in blocks around the encoding target block. The data processing device 1 switches an arithmetic encoding table also based on the occupied state of points in the blocks around the encoding target block. Consequently, encoding efficiency of the point group data is improved.

The encoding unit 21 may change, according to whether points are included in both of a third child space (for example, a child space 12-0-7) adjacent to a first child space (for example, a child space 12-0-5) of the first parent space and the first child space, processing for allocating a sign to a target space (for example, a child space 12-4-1) and a second child space (for example, a child space 12-4-5) of the second parent space.

Second Embodiment

A second embodiment is different from the first embodiment in that the encoding unit 21 narrows down, according to an occupied state of points in another parent space 11 adjacent to the parent space 11 including a target space, candidates of an occupied state of points in the parent space 11 including the target space. In the second embodiment, differences from the first embodiment are explained.

Figure 8:
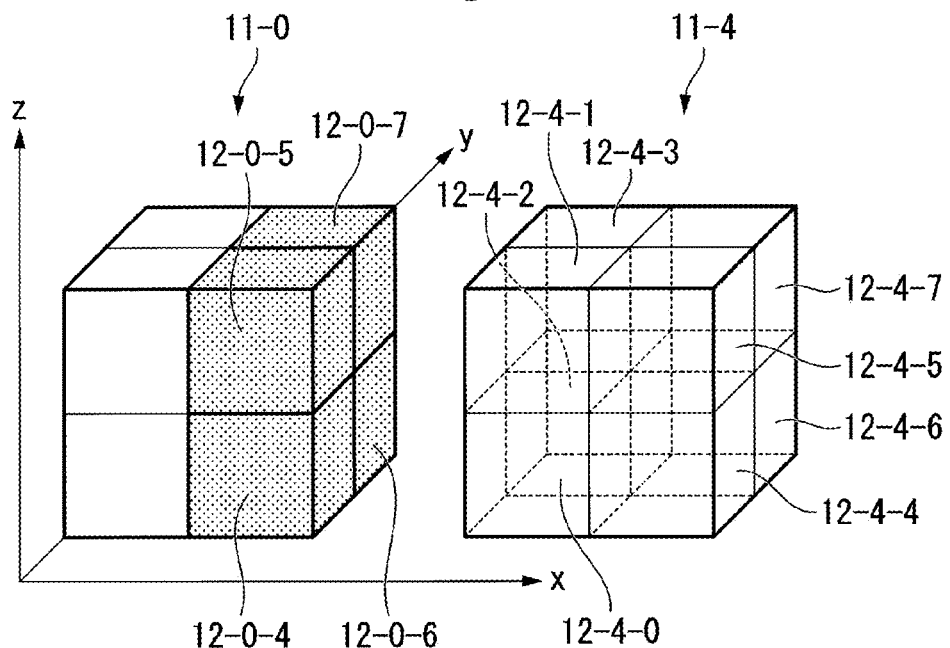
FIG. 8 is a diagram showing an example of parent spaces adjacent to each other in a second embodiment.

FIG. 8 is a diagram showing an example of the parent spaces 11 adjacent to each other. In FIG. 8, the parent space 11-0 and the parent space 11-4 are adjacent to each other. A size of the parent space 11-0 is the same as a size of the parent space 11-4. Child spaces of the parent space 11-0 are already encoded. The parent space 11-0 and the parent space 11-4 are continuous in the direction of the x axis.

The encoding unit 21 determines whether the first parent space (the parent space 11-0) adjacent to the second parent space (the parent space 11-4) including the target space is present. In FIG. 8, since the parent space 11-0 adjacent to the parent space 11-4 is present, the encoding unit 21 selects an arithmetic encoding table for encoding of the parent space 11-4 (the second parent space) according to whether points are included in the child spaces 12 in the parent space 11-0 (the first parent space) (an occupied state of points).

For example, the encoding unit 21 determines whether all the child spaces 12-0 including points in the parent space 11-0 are adjacent to the parent space 11-4. All the child spaces 12-0 including points in the parent space 11-0 may be distributed in parallel to a yz plane. In FIG. 8, all the child spaces 12-0 including points in the parent space 11-0 are adjacent to the parent space 11-4. Accordingly, the encoding unit 21 selects an arithmetic encoding table in which, of a first child space group and a second child space group, which equally divide the parent space 11-4 into two, only the first child space group is set as an encoding target. For example, the encoding unit 21 selects an arithmetic encoding table in which only the first child space group (a child space 12-4-1, a child space 12-4-3, a child space 12-4-5, and a child space 12-4-7), which equally divides the parent space 11-4 into two along an xy plane, is set as an encoding target. A target space (the first child space group) associated with the arithmetic encoding table selected in this way is parallel to the x-axis direction and does not cross the xy plane that equally divides the parent space 11-4 into two.

Figure 9:
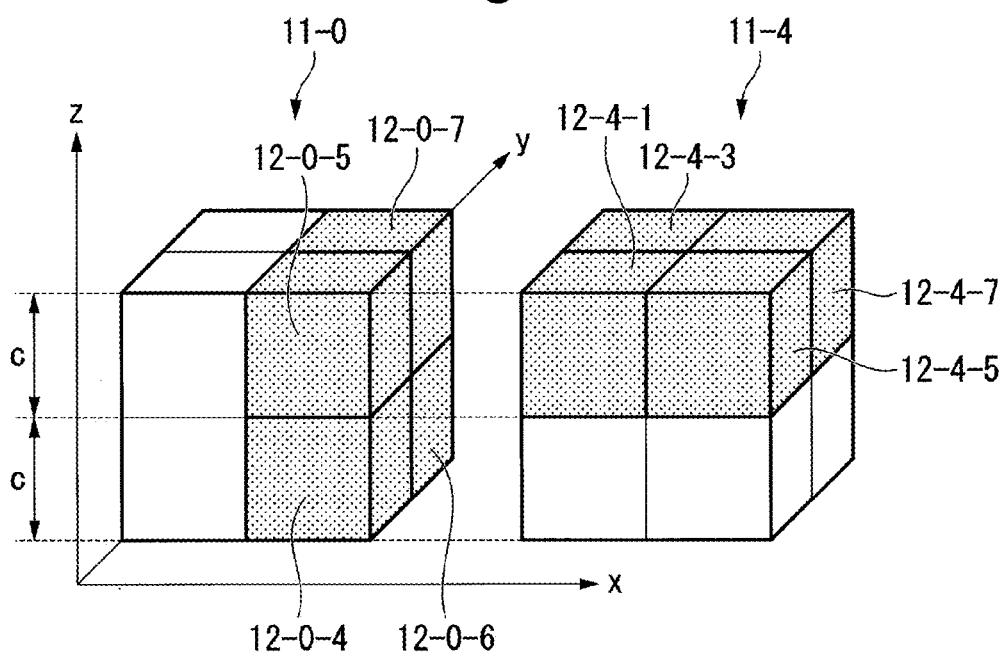
FIG. 9 is a diagram showing a first example of an encoding target child space group in the second embodiment.

FIG. 9 is a diagram showing a first example of an encoding target child space group. In the parent space 11-4, a child space group that can be selected as a target space according to the arithmetic encoding table is regions formed by equally dividing the parent space 11-4 along the xy plane passing the middle point of a side having length "2C" in the z-axis direction of the parent space 11-0. Note that the middle point in this case indicates the center of a space. For example, the middle point refers to a point that is in contact with all the child spaces in the parent space 11-4. In FIG. 9, a child space group that can be selected as a target space is the child space 12-4-1, the child space 12-4-3, the child space 12-4-5, and the child space 12-4-7. When points are included in a region adjacent to the parent space 11-4 in the parent space 11-0 (when points are included in any one of child spaces 12-0-4 to 12-0-7), it is highly likely that points are present in only one of a region (the child spaces 12-4-1, 3, 5, and 7) where a z component in the parent space 11-4 equally divided into two is large and a region where the z component in the parent space 11-4 equally divided into two is small. Accordingly, instead of a sign indicating whether points are present in all the child spaces in the parent space 11-4, a sign indicating, in which of halves of the parent space 11-4 equally divided into two, points are present and a sign indicating, in which of child spaces in a half where points are present in the parent space 11-4 equally divided into two, points are present may be used. Further, an AND condition may be added, the AND condition being that points are included in a region (any one of the child spaces 12-0-4 to 12-0-7) adjacent to the parent space 11-4 in the parent space 11-0 and points are not included in regions not adjacent to the parent space 11-4 (points are not included in all child spaces other than the child space 12-0-4 to the child space 12-0-7 among the child spaces belonging to the parent space 11-0).

In FIG. 9, when compression involving a loss of data is executed, points (signs to be allocated) may be considered absent in the child spaces 12 other than the child space 12-4-1, the child space 12-4-3, the child space 12-4-5, and the child space 12-4-7. Accordingly, the number of patterns of a sign (an occupied state of points) expressed using an arithmetic encoding table is $2^4$. A sign indicating, in which of regions formed by equally dividing the parent space 11-4 into two, points are present is added. As a result, the number of patterns of the sign is less than 255 (=$2^8$–1) ways and the sign can be expressed in 31 (=$2^5$–1) ways. A sign allocated to child spaces not set as encoding targets (child spaces other than the target space) is "0" representing that points are not included.

Figure 10:
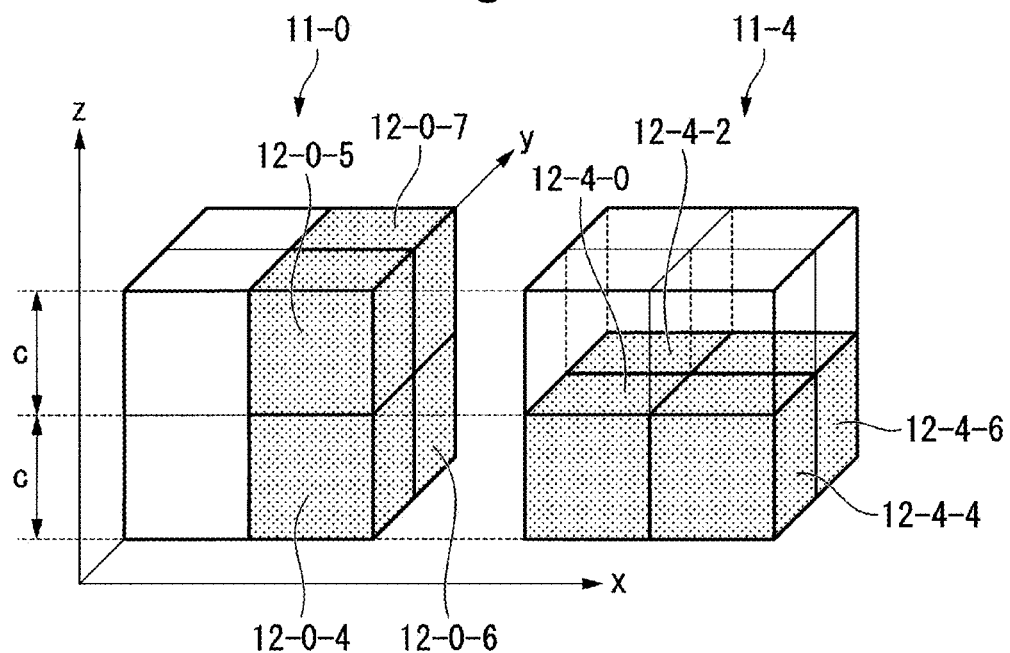
FIG. 10 is a diagram showing a second example of the encoding target child space group in the second embodiment.

FIG. 10 is a diagram showing a second example of the encoding target child space group. In the parent space 11-4, a child space group that can be selected as a target space according to the arithmetic encoding table is regions formed by equally dividing the parent space 11-4 into two along the xy plane passing the middle point of a side having length "2C" in the z-axis direction of the parent space 11-0. In FIG. 10, the child space group that can be selected as the target space is a child space 12-4-0, a child space 12-4-2, a child space 12-4-4, and a child space 12-4-6.

In FIG. 10, when compression involving a loss of data is executed, points (signs to be allocated) may be considered absent in the child spaces 12 other than the child space 12-4-0, the child space 12-4-2, the child space 12-4-4, and the child space 12-4-6. Accordingly, the number of patterns of a sign (an occupied state of points) expressed using an arithmetic encoding table is less than 255 (=$2^8$–1) ways and may be 31 (=$2^5$–1) ways as in the example shown in FIG. 9. A sign allocated to child spaces not set as encoding targets (child spaces other than the target space) is "0" representing that points are not included.

Figure 11:
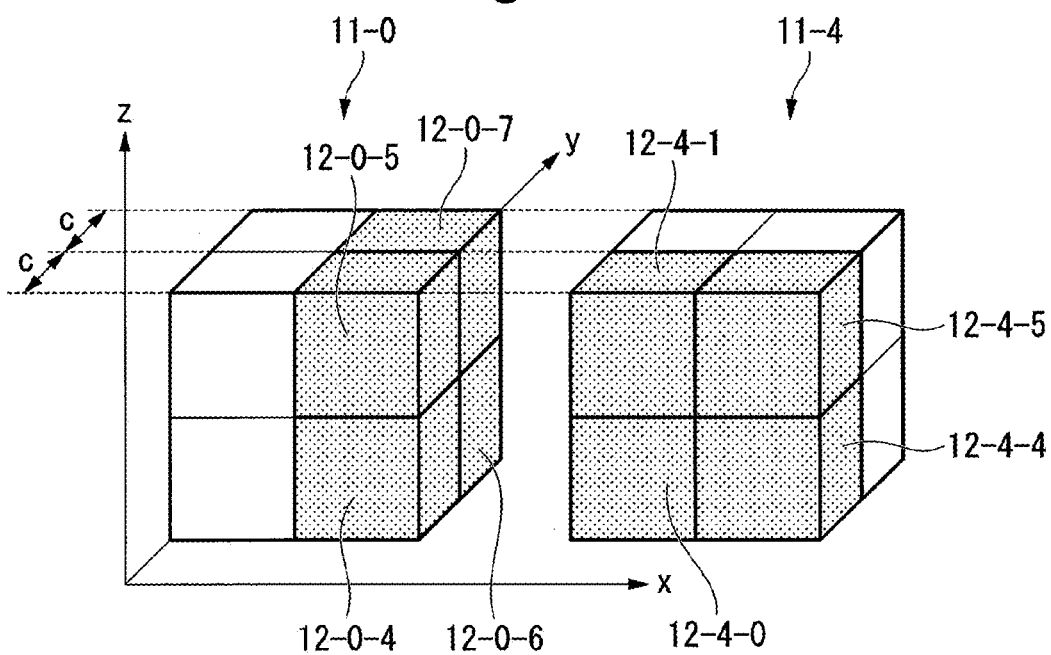
FIG. 11 is a diagram showing a third example of the encoding target child space group in the second embodiment.

FIG. 11 is a diagram showing a third example of the encoding target child space group. In the parent space 11-4, a child space group that can be selected as a target space according to the arithmetic encoding table is regions formed by equally dividing the parent space 11-4 into two along an xz plane passing the middle point of a side having length "2C" in the y-axis direction of the parent space 11-0. Note that the middle point in this case indicates the center of a space. For example, the middle point refers to a point that is in contact with all the child spaces in the parent space 11-4. In FIG. 11, the child space group that can be selected as the target space is the child space 12-4-0, the child space 12-4-1, the child space 12-4-4, and the child space 12-4-5. When points are included in a region adjacent to the parent space 11-4 in the parent space 11-0 (when points are included in any one of the child spaces 12-0-4 to 12-0-7), it is highly likely that points are present in only one of a region where a y component in the parent space 11-4 equally divided into two is large and a region (the child spaces 12-4-0, 1, 4 and 5) where the y component in the parent space 11-4 equally divided into two is small. Accordingly, instead of the sign indicating whether points are present in all the child spaces in the parent space 11-4, a sign indicating, in which of halves of the parent space 11-4 equally divided into two, points are present and a sign indicating, in which of child spaces in a half where points are present in the parent space 11-4 equally divided into two, points are present may be used. Further, an AND condition may be added, the AND condition being that points are included in a region (any one of the child spaces 12-0-4 to 12-0-7) adjacent to the parent space 11-4 in the parent space 11-0 and points are not included in regions not adjacent to the parent space 11-4 (points are not included in all child spaces other than the child space 12-0-4 to the child space 12-0-7 among the child spaces belonging to the parent space 11-0).

In FIG. 11, when compression involving a loss of data is executed, points (signs to be allocated) may be considered absent in the child spaces 12 other than the child space 12-4-0, the child space 12-4-1, the child space 12-4-4, and the child space 12-4-5. Accordingly, the number of patterns of a sign (an occupied state of points) expressed using an arithmetic encoding table is less than 255 (=$2^8$–1). When a sign indicating, in which of regions formed by equally dividing the parent space 11-4 into two, points are present and a sign indicating whether points in each of the child spaces 12-4-0, 1, 4, and 5 are present are added, the number of the sign may be 31 (=$2^5$–1) ways.

Figure 12:
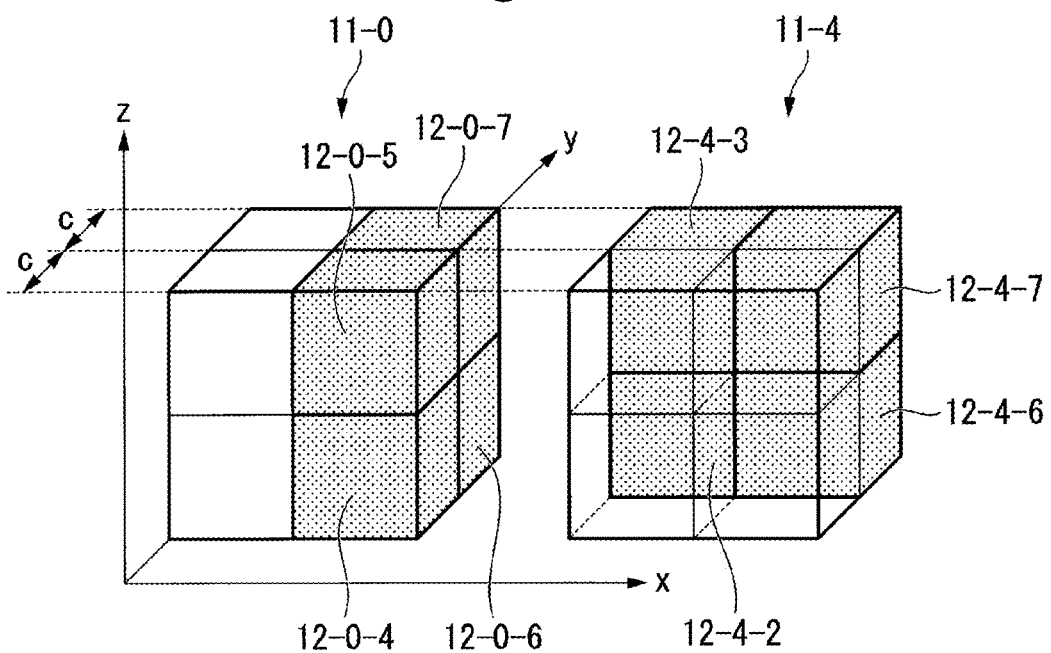
FIG. 12 is a diagram showing a fourth example of the encoding target child space group in the second embodiment.

FIG. 12 is a diagram showing a fourth example of the encoding target child space group. In the parent space 11-4, a child space group that can be selected as a target space according to the arithmetic encoding table is regions formed by equally dividing the parent space 11-4 into two along the xy plane passing the middle point of a side having length "2C" in the y-axis direction of the parent space 11-0. In FIG. 12, the child space group that can be selected as the target space is the child space 12-4-2, the child space 12-4-3, the child space 12-4-6, and the child space 12-4-7.

In FIG. 12, when compression involving a loss of data is executed, points (signs to be allocated) may be considered absent in the child spaces 12 other than the child space 12-4-2, the child space 12-4-3, the child space 12-4-6, and the child space 12-4-7. Accordingly, the number of patterns of a sign (an occupied state of points) expressed using an arithmetic encoding table is less than 255 (=$2^8$–1) ways. When a sign indicating, in which of regions formed by equally dividing the parent space 11-4 into two, points are present and a sign indicating whether points in each of the child spaces 12-4-2, 3, 6, and 7 are present are added, the number of the sign may be 31 (=$2^5$–1) ways.

The number of patterns of the sign (the occupied state of points) expressed using the arithmetic encoding table is "$2^5$–1" ways in a case corresponding to the examples shown in FIG. 9 and FIG. 10 and is "$2^5$–1" ways in a case corresponding to the examples shown in FIG. 11 and FIG. 12. In a case corresponding to all the examples shown in FIG. 9 to FIG. 12, the sign indicating whether the parent space is divided into two is added as shown in "FIG. 9 and FIG. 10" or "FIG. 11 or FIG. 12". The number of patterns may be "$2^6$-1 ways".

The encoding unit 21 may add flag data to an entire or a part of an encoded stream including an encoding result. When a value of the flag data is 0, the flag data represents, for example, the xy plane shown in FIG. 9 or FIG. 10. When the value of the flag data is 1, the flag data represents, for example, the xz plane shown in FIG. 11 or FIG. 12. The encoding unit 21 may determine, when deciding the arithmetic encoding table (the switching data), which plane of the xy plane and the xz plane is adopted.

The decoding device 3 selects, according to whether points are included in the child spaces 12 of the other parent space 11 adjacent to the decoding target parent space 11, the arithmetic encoding table used for decoding of the decoding target parent space 11. The decoding device 3 selects, based on the arithmetic encoding table, for example, the same arithmetic encoding table as the arithmetic encoding table used for encoding of the parent space 11 by the encoding device 2. The decoding device 3 may select, according to whether points are included in the child spaces 12 of the other parent space 11 adjacent to the decoding target parent space 11 (an occupied state of points), the switching data in the same manner as performed by the encoding device 2.

Subsequently, an operation example of the encoding device 2 is explained.

Figure 13:
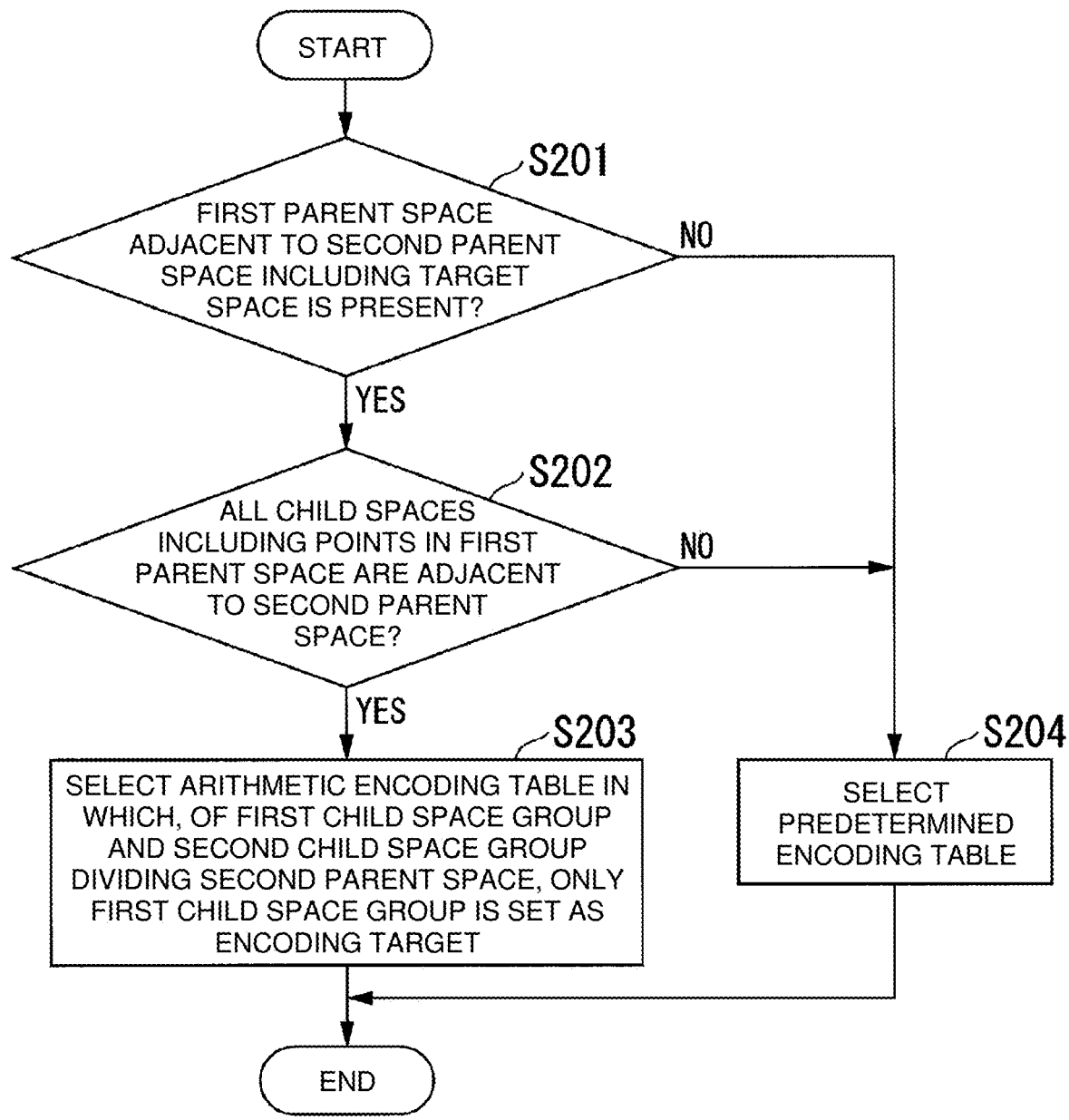
FIG. 13 is a flowchart showing an operation example of an encoding device in the second embodiment.

FIG. 13 is a flowchart showing an operation example of the encoding device 2. The encoding unit 21 determines whether the first parent space (for example, the parent space 11-0) adjacent to the second parent space (for example, the parent space 11-4) including a target space is present (step S201).

When the first parent space adjacent to the second parent space is present (step S201: YES), the encoding unit 21 determines whether all the child spaces 12 including points in the first parent space are adjacent to the second parent space (step S202).

When all the child spaces 12 including points in the first parent space are adjacent to the second parent space (step S202: YES), the encoding unit 21 selects an arithmetic encoding table in which, of the first child space group and the second child space group dividing the second parent space, only the first child space group is set as an encoding target. For example, the encoding unit 21 may select an arithmetic encoding table in which only a child space group (the child space 12-4-1, the child space 12-4-3, the child space 12-4-5, and the child space 12-4-7), which equally divides the parent space 11-4 along the xy plane into two, is set as an encoding target (step S202).

When the first parent space adjacent to the second parent space is absent (step S201: NO), the encoding unit 21 selects a predetermined arithmetic encoding table (step S204). When any one of the child spaces 12 including points in the first parent space is not adjacent to the second parent space (step S202: NO), the encoding unit 21 advances the processing to step S204.

As explained above, in the second embodiment, the first parent space (for example, the parent space 11-0) and the second parent space (for example, the parent space 11-4) are adjacent to each other. The target space (for example, the child space 12-4-1) to which a code is allocated is included in, of the first child space group (for example, the child space 12-4-1, the child space 12-4-3, the child space 12-4-5, and the child space 12-4-7) and the second child space group dividing the second parent space, the first child space group. The first child space group includes a child space (for example, the child space 12-4-3) adjacent to the first parent space in the second parent space. When points are included in any one of the child spaces (for example, the child space 12-0-4, the child space 12-0-5, the child space 12-0-6, and the child space 12-0-7) adjacent to the second parent space (for example, the parent space 11-4) in the first parent space and points are not included in all of the child spaces (for example, the child spaces 12-0-0, the child space 12-0-1, the child space 12-0-2, and the child space 12-0-3) not adjacent to the second parent space in the first parent space, the encoding unit 21 changes processing for allocating a sign to the first child parent group.

Consequently, it is possible to improve encoding efficiency of a point group distributed along the surface of an object.

When the first parent space and the second parent space of the same size are adjacent to each other, point group data of the first parent space and point group data of the second parent space are likely to represent regions on the same surface in an object. When the first parent space has point group data only on a surface where the first parent space and the second parent space of the same size are adjacent, the point group data of the first parent space and the point group data of the second parent space are likely to represent surfaces forming a corner in the object. For example, in the object 200 (the desk made of wood) illustrated in FIG. 2, for example, the parent space 11-0 is likely to represent a side surface of the object 200 and, for example, the parent space 11-4 is likely to represent the top surface of the object 200. That is, when the first parent space and the second parent space of the same size have the point group data each other and the first parent group has the point group data only on an adjacent surface of the first parent space and the second parent space, the second parent space is highly likely to have the point group data only on a surface (for example, the xy plane or the xz plane) parallel to a direction (for example, the x direction) in which the first parent space and the second parent space stretch.

In this way, the encoding unit 21 narrows down candidates of an occupied state of points in a target space according to a point group data occupied state of adjacent nodes. Consequently, an arithmetic encoding table of a parent space (node) in, a boundary between a surface and a surface of an object is generated such that a codeword is shorter than in the past. Point group data is encoded based on the arithmetic encoding table in which the codeword is expected to be shorter than in the past. Therefore, since a code amount of the point group data is reduced, encoding efficiency is improved.

Note that, in order for the encoding unit 21 to execute compression not involving a loss of data (loss-less compression), for example, an item "other than these choices" may be associated with the arithmetic encoding table. When the item "other than these choices" is selected by the encoding unit 21, the encoding unit 21 selects any child space group (choice) in the parent space 11 as a target of the arithmetic encoding table.

Third Embodiment

A third embodiment is different from the second embodiment in that division of the three-dimensional space 10 is repeated and a size of the parent space 11 including a target space (the child space 12) is equal to or smaller than a predetermined threshold "N". In the third embodiment, differences from the second embodiment are explained.

The encoding unit 21 determines whether a size of the second parent space (for example, the parent space 11-4) including the target space is equal to or smaller than the threshold "N". When the size of the second parent space including the target space is equal to or smaller than the threshold, the encoding unit 21 determines whether the first parent space (for example, the parent space 11-0) adjacent to the second parent space including the target space is present. When the first parent space adjacent to the second parent space is present, the encoding unit 21 determines whether all the child spaces 12 including points in the first parent space are adjacent to the second parent space. When all the child spaces 12 including points in the first parent space are adjacent to the second parent space, the encoding unit 21 selects an arithmetic encoding table in which, of the first child space group and the second child space group dividing the second parent space, only the first child space group is set as an encoding target.

The decoding device 3 determines whether a size of a decoding target second parent space (for example, the parent space 11-4) is equal to or smaller than a threshold. The decoding device 3 determines whether points are included in the child space 12 of the first parent space adjacent to the decoding target second parent space (an occupied state of points). The decoding device 3 selects, according to whether points are included in the child space 12 of the first parent space adjacent to the decoding target second parent space, an arithmetic encoding table used for decoding of the decoding target second parent space.

Figure 14:
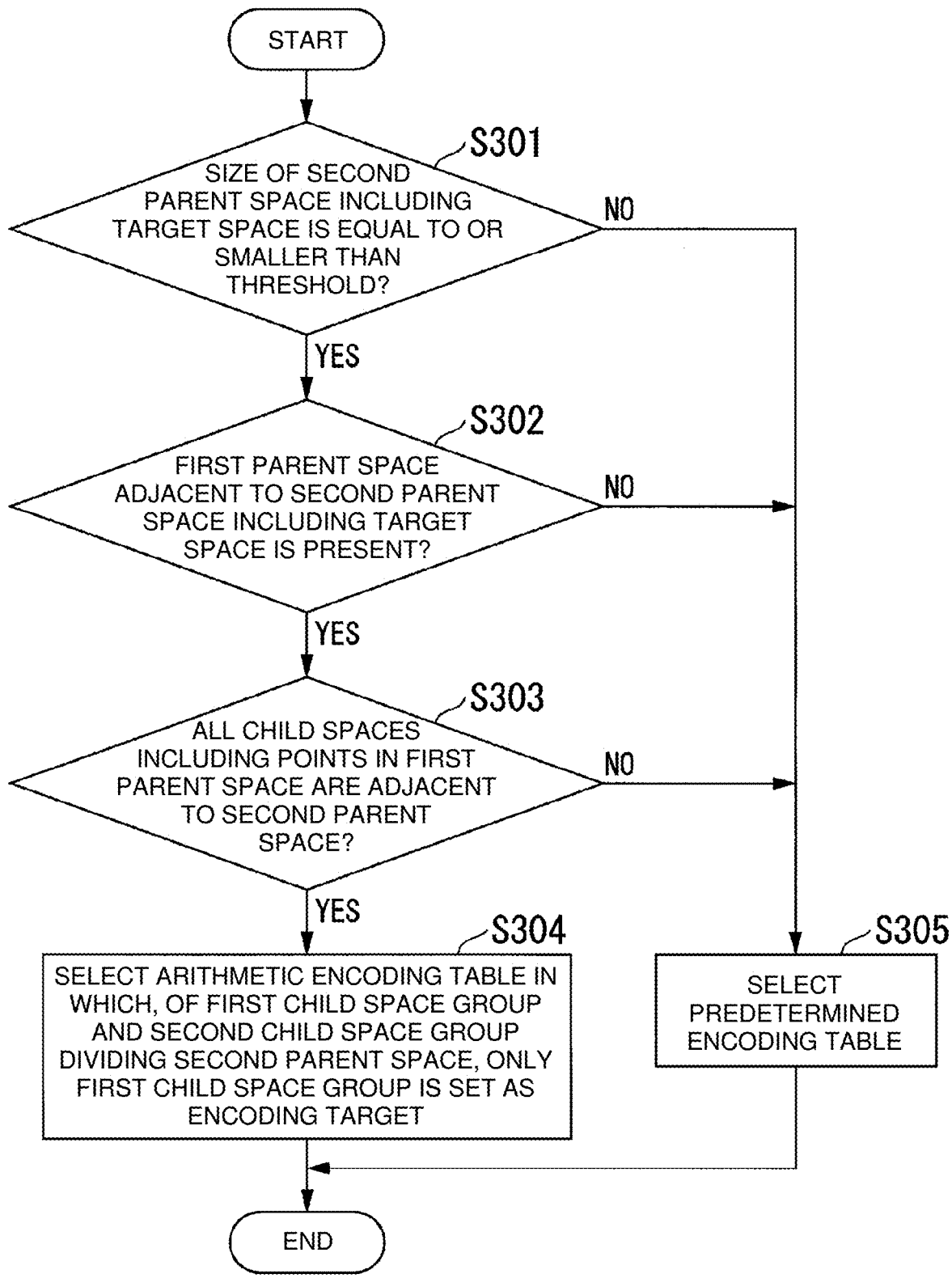
FIG. 14 is a flowchart showing an operation example of an encoding device in a third embodiment.

FIG. 14 is a flowchart showing an operation example of the encoding device 2. The encoding unit 21 determines whether a size of the second parent space including the target space is equal to or smaller than the threshold "N" (step S301). When the size of the second parent space including the target space exceeds the threshold "N" (step S301: NO), the encoding unit 21 advances the processing to step S305. When the size of the second parent space including the target space is equal to or smaller than the threshold "N" (step S301: YES), the encoding unit 21 advances the processing to step S302.

Operations in step S302 to step S305 shown in FIG. 14 are respectively the same as the operations in step S201 to step S204 shown in FIG. 13.

As explained above, when a size ($=2^k$) of the parent space 11-4 including the target space (for example, the child space 12-4-1) is equal to or smaller than the predetermined threshold "N", the encoding unit 21 in the third embodiment may change, according to whether points are included in the first child space (for example, the child space 12-0-5) of the parent space 11-0 adjacent to the parent space 11-4, processing for allocating a sign respectively to the target space and the second child space (for example, the child space 12-4-5). The position of the first child space, the position of the target space, and the position of the second child space are continuous in, for example, the x-axis direction.

Consequently, it is possible to improve encoding efficiency of a point group distributed along the surface of an object.

As explained in the second embodiment, the second parent space has the point group data only on the surface parallel to the direction in which the first parent space and the second parent space stretch. As the distance between the first parent space and the second parent space adjacent to each other is shorter, it is more highly likely that the second parent space has the point group data only on the surface parallel to the direction in which the first parent space and the second parent space stretch. That is, as the size of the second parent space including the target space is smaller, the distance between the first parent space and the second parent space adjacent to each other is shorter. When an occupied state of points in the second parent space is narrowed down using an occupied state of points in the first parent space, a probability of the occupied state of points in the second parent space being equal to at least one of choices in an arithmetic encoding table is higher. Accordingly, when the sizes of the first parent space and the second parent space are equal to or smaller than the predetermined threshold, the encoding unit 21 is capable of further improving the encoding efficiency.

The embodiments of the present invention are explained in detail above with reference to the drawings. However, a specific configuration is not limited to the embodiments. Design and the like in a range not departing from the gist of the present invention are also included in the specific configuration.

INDUSTRIAL APPLICABILITY

The present invention is applicable to a device that encodes and decodes point group data (a data processing device).

REFERENCE SIGNS LIST

1 Data processing device
2 Encoding device
3 Decoding device
4 Memory
5 Storage unit
6 Bus
10 Three-dimensional space
11 Parent space
12 Child space
20 Division unit
21 Encoding unit
100 Point group
200 Object

The invention claimed is:

1. An encoding device comprising:
a processor; and
a storage medium having computer program instructions stored thereon, when executed by the processor, cause the processor to perform:
acquires three-dimensional data representing positions of a plurality of points distributed along a surface of an object in a three-dimensional space and divides a parent space including the points in the three-dimensional space into a plurality of child spaces; and
changes, based on a position of a target space, which is the child space, to which a sign representing whether the points are included is allocated, according to whether the points are included in a first child space adjacent to the target space, processing for allocating the sign to the target space and a second child space adjacent to the target space,
wherein a first parent space and a second parent space among a plurality of the parent spaces are adjacent to each other, the target space is included in a first child space group and a second child space group dividing the second parent space, the first child space group, and the first child space group includes the child space adjacent to the first parent space in the second parent space.

2. The encoding device according to claim 1, wherein the computer program instructions further perform changes, according to whether the points are included in both of a third child space adjacent to the first child space, the processing for allocating the sign to the target space and the second child space.

3. The encoding device according to claim 1, wherein, when the points are included in any one of the child spaces adjacent to the second parent space in the first parent space and the points are not included in all of the child spaces not adjacent to the second parent space in the first parent space, the computer program instructions further perform changes processing for allocating the sign to the first child space group.

4. The encoding device according to claim 1, wherein, when a size of the parent space including the target space is equal to or smaller than a predetermined threshold, the computer program instructions further perform changes, according to whether the points are included in the first child space, processing for allocating the sign respectively to the target space and the second child space.

5. A non-transitory computer-readable medium having computer-executable instructions that, upon execution of the instructions by a processor of a computer, cause the computer to function as the encoding device according to claim 1.

6. An encoding method executed by an encoding device, the encoding method comprising:
- a step of acquiring three-dimensional data representing positions of a plurality of points distributed along a surface of an object in a three-dimensional space and dividing a parent space including the points in the three-dimensional space into a plurality of child spaces; and
- a step of changing, based on a position of a target space, which is the child space, to which a sign representing whether the points are included is allocated, according to whether the points are included in a first child space adjacent to the target space, processing for allocating the sign to the target space and a second child space adjacent to the target space
- wherein a first parent space and a second parent space among a plurality of the parent spaces are adjacent to each other, the target space is included in a first child space group and a second child space group dividing the second parent space, the first child space group, and the first child space group includes the child space adjacent to the first parent space in the second parent space.

7. An encoding method executed by an encoding device, the encoding method comprising:
- acquiring three-dimensional data representing positions of a plurality of points distributed along a surface of an object in a three-dimensional space;
- dividing the plurality of points in the three-dimensional space into a plurality of parent spaces;
- determining whether a first parent space in the plurality of parent spaces is adjacent to a second parent space in the plurality of parent spaces;
- selecting an enhanced arithmetic encoding table for encoding the first parent space in response to the determination that the first parent space is adjacent to the second parent space, where the enhanced arithmetic encoding table excludes points shared between the first parent space and the second parent space as targets for encoding;
- selecting a predetermined arithmetic encoding table for encoding the first parent space in response to the determination that the first parent space is not adjacent to the second parent space, where the enhanced arithmetic encoding table allocates all points associated with the first parent space as targets for encoding; and
- encoding the first parent space in accordance with the selected arithmetic encoding table.

* * * * *